United States Patent [19]

Rickert

[11] 4,030,839

[45] June 21, 1977

[54] FREQUENCY SELECTIVE REFLEX SIGHT

[76] Inventor: Glenn Edward Rickert, R.R. No. 9, Huntington, Ind. 46750

[22] Filed: Oct. 1, 1973

[21] Appl. No.: 402,376

Related U.S. Application Data

[63] Continuation-in-part of Ser. No. 245,849, April 20, 1972, abandoned, which is a continuation-in-part of Ser. No. 732,234, May 27, 1968, abandoned, which is a continuation-in-part of Ser. No. 610,302, Jan. 19, 1967, Pat. No. 3,524,710.

[52] U.S. Cl. .............................. 356/251; 350/174; 356/254
[51] Int. Cl.² ....................................... G02B 27/34
[58] Field of Search ............ 33/241, 242; 356/251, 356/252, 253, 254, 255; 350/10, 174

[56] References Cited

UNITED STATES PATENTS

| | | | |
|---|---|---|---|
| 683,203 | 9/1901 | Grubb | 356/251 |
| 2,633,051 | 3/1953 | Davis | 356/251 |
| 2,780,130 | 2/1957 | Mauer | 356/251 |
| 2,852,974 | 9/1958 | Nobles | 356/251 X |
| 3,230,819 | 1/1966 | Noxon | 356/251 |
| 3,880,529 | 4/1975 | Althause et al. | 356/251 |

*Primary Examiner*—F. L. Evans
*Attorney, Agent, or Firm*—Gust, Irish, Jeffers & Rickert

[57] ABSTRACT

A reflex gun sight is disclosed which provides a collimated image of a reticle, which reticle is lighted by ambient down range light. This image and the view of a target are combined by a frequency selective beam combining device. The frequency selective combination causes the reticle to appear to an observer in a color which contrasts with the target.

9 Claims, 4 Drawing Figures

Inventor
GLENN E. RICKERT
by JEFFERS & YOUNG
Attorneys

FREQUENCY SELECTIVE REFLEX SIGHT

CROSS REFERENCE TO RELATED APPLICATIONS

This application is a continuation-in-part of Ser. No. 245,849 filed Apr. 20, 1972, now abandoned, which in turn is a continuation-in-part of Ser. No. 732,234 filed May 27, 1968, now abandoned, which in turn was a continuation-in-part of Ser. No. 610,302 filed Jan. 19, 1967, now U.S. Pat. No. 3,524,710.

BACKGROUND OF THE INVENTION

This invention relates to collimated aiming devices and more particularly to collimated beam combining gun sights, also known as reflex gun sights.

Reflex sights have been known for a number of years. Their design generally employs the reflection of a reticle from a semi-transparent mirror surface through which mirror the target is also viewed. A collimator is employed to cause a reticle image to appear at or near infinity, parallax free, and in focus with the target. The collimator may be a refracting lens in the system or the semi-transparent mirror may be concave instead of flat so that it collimates the reticle image as it reflects it.

The semi-transparent mirrors used in reflex sights transmit a percentage of the target light and reflect a percentage of the reticle light, the sum of which for a given frequency is not over 100%.

If a semi-transparent dichroic mirror is chosen which is not color selective and which has a sufficiently high reflection character to permit seeing the reticle against the sky, then the mirror does not transmit sufficient target light to permit seeing dimly lighted targets even though the mirror employed may be a modern 95 or 98% efficiency dichroic mirror. Conversely, if a mirror is chosen for somewhat darker targets, that mirror will not permit seeing the reticle against bright targets.

To overcome this problem, several aiming devices have been designed which attempted to make the image discernable not by brightness compared to the target brightness, but by making the image appear in a specific color which color was made brighter than the same color in the target view by employing an electric powered light source. A filter and/or a narrow band reflector mirror was employed to give the specific color to the image and the electric powered cathode ray tube provided the needed brightness, of that frequency or color to make the image sufficiently bright to be discernable, Nobles U.S. Pat. No. 2,853,974 and Noxon U.S. Pat. No. 3,230,819. Such a system is, of course, usable in a motor powered vehicle where an electric power source is available to get an intense reticle light, but is not practical for a portable shoulder arm carried by a foot soldier or a hunter.

One sight acquired the needed special brightness of the specific reticle color by employing a fluorescent material which absorbed rays from a different portion of the spectrum, such as ultra-violet and near ultra-violet, and emitted a narrow band of visible light in a lower frequency, Mauer U.S. Pat. No. 2,780,130 and the aforementioned Rickert U.S. Pat. No. 3,523,710. Such a fluorescent system provided the needed brightness of the chosen reticle frequency of color. A mirror designed to efficiently reflect this fluorescent frequency was employed, but again the mirror did not make the reticle appear a certain color it merely reflected a certain colored reticle.

Such a gun sight is presently sold on the market and works for a hunter out in the open where the sky light provides the needed ultra-violet or near ultra-violet light to operate the fluorescent material.

For a foot soldier in combat, however, where he many times shoots at his enemy from a hidden position such as hidden in the cover of trees, brush, a building or a cavelike structure, it has been found that none of the presently available fluorescent materials will operate and emit their fluorescent light when the light striking them is light reflected from the countryside. They require ultra-violet or near ultra-violet light from the open sky. Fluorescent illuminated sights have therefore been found impractical for the combat soldier.

Another sight was developed which employed a semi-transparent mirror which mirror reflected a narrow portion only of the color spectrum such as yellow (0.589 microns) or such as a farther down scale yellow orange frequency. The reticle was provided with this specific frequency by employing overhead skylight, down range skylight, and target light directed by a prism to a reticle having white reticle lines or marks, Davis U.S. Pat. No. 2,633,051.

When this sight was aimed at a target of the right brightness and also aligned to the proper reticle illuminating light sources, the reticle appeared sufficiently bright to be usable. However, when this sight was aimed at too bright a target or when the reticle light sources were not properly located, or when the sight was aimed from a cavelike structure which shaded the skylight, the reticle was then insufficiently bright to be practical.

The foregoing was given to more clearly present the problem and to more clearly define the invention.

SUMMARY OF THE INVENTION

The present invention provides a sight which does not depend on sufficient reticle brightness by the use of an electrical light source, or by the use of fluorescent light source or by the use of the bright overhead open skylight. In the present invention, the reticle is illuminated by light from the target area. This is necessary in order to provide a sight which can be aimed from a hidden position, as is encountered in miliary combat, where overhead or skylight is often not available. This system of reticle illumination also provides a reticle which is always visible regardless of target brightness because it varies in brightness in proportion to the target brightness, thus giving a bright reticle for a bright target and a less bright reticle for a less bright target.

To employ any of the previously disclosed selective reflector semi-transparent mirrors in such a down range lighted reticle sight would require that the sight always be aimed at a target which gives off the specific color that the semi-transparent mirror reflects and which gives off that frequency of light in sufficient brightness to illuminate the reticle properly. Failure is met when a target is chosen which does not give off the specific frequency of light for which the mirror is designed to reflect, for then the reticle is not sufficiently bright to be used.

The present invention employs a high efficiency semi-transparent dichroic mirror having unique reflective characteristics.

First, the present invention employs a mirror which is reflective to a wide or substantial range of visible light. It is not just a narrow band reflector of a specific frequency.

In order that the reticle be visible when the sight is aimed at a blue sky, and visible when aimed at green trees, and visible when aimed at yellow autumn trees, and visible when aimed at red colored autumn leaves, the mirror reflecting the reticle light must be designed to reflect the light coming from such differently colored targets. The present invention employs such a mirror.

Secondly, the present invention although employing a mirror which reflects a wide range of colors of visible light, it does so in a preferential manner. That is, the mirror reflects some of the frequencies at a different percentage than it transmits those same frequencies while also reflecting other frequencies in either a less or more preferential manner.

The graph line of reflection-transmission of the semi-transparent mirror is varied in its percentage of reflection-transmission from one end of the spectrum to the other, such that when viewing a predominantly blue target the reticle looks less blue or more greenish-yellow than the target, while also when viewing a green target the reticle looks less green and more yellowish than the target, while also when viewing a yellow target the reticle looks less yellow and more orangelike than the target, while also when viewing an orange or red target the reticle looks less orange and more red or deeper red than the target.

The semi-transparent mirror can be said to reflect over a wide or substantial range of the visible spectrum in percentages of reflection-transmission where the red end of the spectrum is reflected in higher percentages or in a more saturated color and the blue end of the spectrum is reflected in less percentages or less saturated color. The transmission is the reciprocal of the reflection minus a very small percentage of loss (in some coatings, less than 5%) as the mirror transmits that which it does not reflect, and reflects that which it does not transmit, the total of which is just slightly under 100% of the target light coming to it. This higher reflection and lower transmission of a given frequency along with a higher transmission and lower reflection of another color also serves to help enhance the discernability of the reticle superimposed on the target.

Thirdly, it should be kept in mind that things in nature which reflect light, although they appear a specific color to the observer, do not reflect a monochromatic color as can be produced in a science laboratory. Even though an object may appear red or green, it is in fact only predominantly that color and a red object may reflect to a lesser extent a deeper red color as well as an orange-red color. The green object may reflect some bluish tints and some yellowish tints for example. The semi-transparent mirror of the present invention is specifically designed to efficiently use this phenomena to help set the reticle off at a different appearing color than the target regardless of the apparent color of the target, be it a red, orange, yellow, green or blue appearing target.

In addition, the gunsight is adapted so that the target area used to illuminate the reticle, is an area bigger than the target itself, and as most target areas comprise objects of more than one color, the reticle is thus often illuminated by colors other than the specific target color.

One object of this invention is to provide a reflex sight having a reticle brightness which is directly proportional to the brightness of the object being viewed.

A further object of this invention is to provide a highly accurate sight which may be used in all types of adverse lighting conditions, both very bright or very dim.

A still further object of this invention is to provide a sight having an auxiliary light source for night use.

A salient object of the invention is to provide a reflex sight having a collimated image of a reticle wherein the retticle image is made to contrast in color with the target being sighted through the use of a special frequency selective beam combining device.

A further object of the invention is to provide a sight reticle which is lighted by down range light.

BRIEF DESCRIPTION OF THE DRAWING

These and other objects of the invention will appear more clearly from the following description of a preferred embodiment of the invention wherein.

DESCRIPTION OF THE PREFERRED EMBODIMENT

Figure 1:
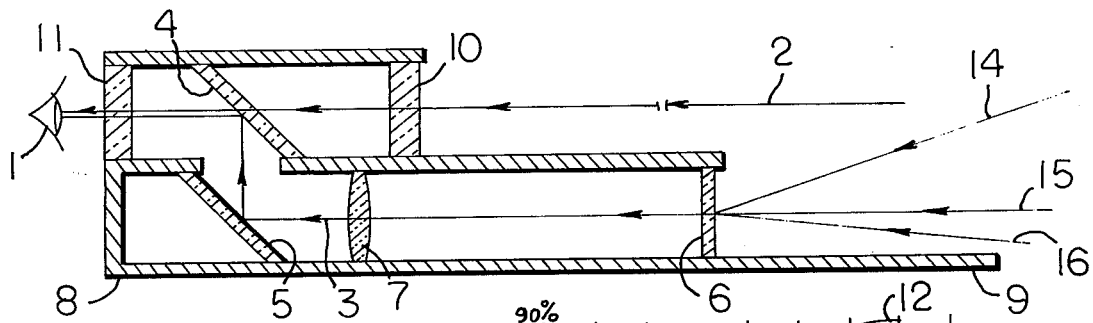
FIG. 1 is a cross-sectional view of the preferred form of my invention.

A preferred embodiment of the invention is shown in FIG. 1 where an observer 1 views a target along a line of sight 2 while at the same time, the observer 1 views a collimated image of a reticle mark or indicia 6 along the deviated line of sight 3. The line of sight 3 is deviated by two reflecting surfaces 4 and 5 which are arranged in periscopic relationship. The collimated image of the reticle indicia is created by a refracting lens 7 having a positive focal length approximately equal to the distance from the lens to the reticle. The several optical elements are held in place by a sight body 8 which includes an extended portion 9 for receiving an auxiliary light for night use. The sight body may be made dust and water proof by including windows at 10 and 11. The reticle indicia 6 consists of a light transmitting portion on an otherwise opaque background.

While the plane reflecting surface 5 is a standard fully silvered mirror, the plane reflecting surface 4 is a frequency selective beam combining device such as a semi-transparent frequency selective reflector. A special high efficiency color selective beam combining mirror having a higher reflection and lower transmission in one portion of the visible spectrum and a higher transmission and lower reflection in another portion of the visible spectrum has been satisfactorily used.

Figure 2:
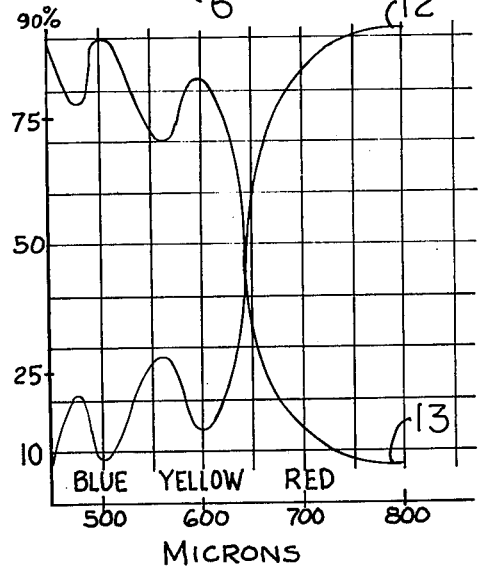
FIG. 2 is a graph showing the typical spectral properties of a suitable broad band frequency selective reflector for use in the present invention.

FIG. 2 shows a graph of the spectral properties of such a beam combining mirror. Two curves are shown, the first curve 12, shows the percentage of available light which is reflected as a function of its wavelength. It is clear from the graph that the mirror reflects frequencies throughout the entire visible spectrum, but does so in a preferential manner so that in general it reflects a higher and higher percentage of the light as you travel across the graph toward the red end.

Conversely, it can be seen from the graph that the mirror transmits the entire visible spectrum, but transmits in a preferential manner where it transmits a higher percentage of the blue frequencies, a less high percentage of yellow and a still less percentage of orange and red.

A mirror could be employed which does not transmit and reflect all of the visible spectrum but it must be a mirror which at least reflects more than a specific frequency or specific portion of the visible band to make the reticle sufficiently bright in cases where a specific target view does not contain those frequencies that the mirror is designed to reflect.

A mirror which does not reflect and/or transmit all of the visible spectrum may be used provided that it reflects and/or transmits a sufficiently large portion to include the colors given off by a target view which emits only a portion of the visible spectrum. In addition, although the sloping graph shows more than one half of the red end as reflected and more than one half of the blue end transmitted, a mirror could be chosen which reflected more than one half of one end of the spectrum, say 75%, and which reflected more than one half of the other end of the spectrum, say 52%, provided there is sufficient slope to the graph to make the reticle discernable against the target. The same could be true concerning transmission.

Returning now to FIG. 1, the operation of the sight should be clear. Light from the target will reach the observer directly along beam 2 while, at the same time, light from the general direction of the target area or ambient light will reach the rear side of the reticle indicia 6 along the several beams 14, 15 and 16. Some of this light will pass through the fine reticle indicia lines and be collimated by the lens 7. This collimated light will be fully reflected by the mirror 5 and will be selectively reflected by the beam combining device 4 so that the reticle image will be more intensely lighted by the frequencies toward the red end of the spectrum and contrast with the target view which is lighted more intensely by colors nearer the bluish end of the spectrum. Thus, in most cases, the observer will view an apparently red or orange like reticle image along the line of sight 2. Any particular frequency portion or portions of the visible spectrum may be chosen as that which is reflected by the beam combining mirror, however, the frequency characteristics illustrated in FIG. 2 have been found to be highly suitable under most all sighting conditions.

Figure 3:
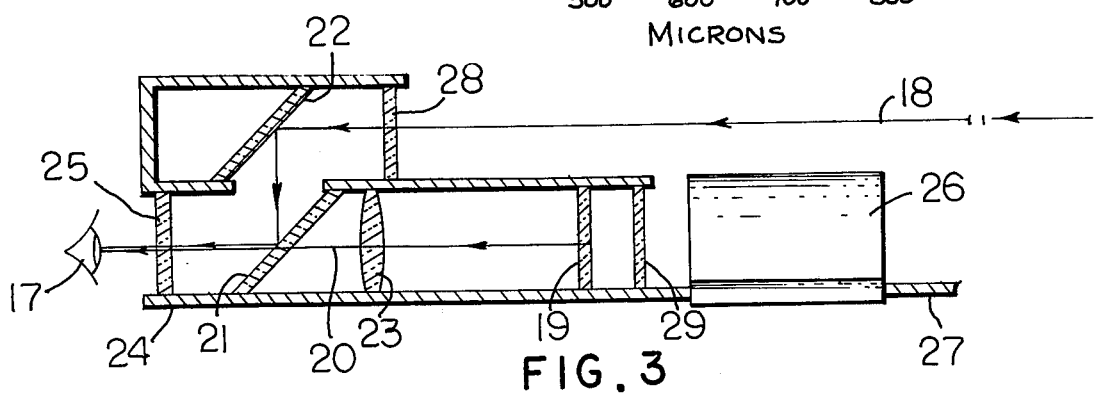
FIG. 3 is a fragmentary cross-sectional view of one alternative form of my invention showing the auxiliary light source in place.
Figure 4:
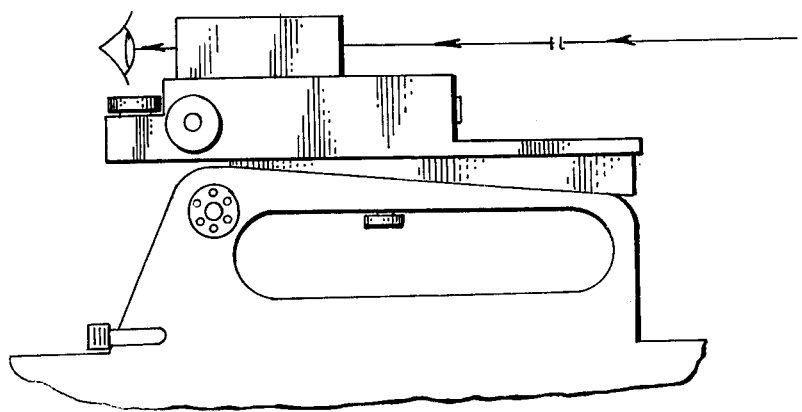
FIG. 4 is a perspective view of the sight of FIG. 1 shown in place on the receiver of a rifle.

FIG. 3 shows a variation on the sight of FIG. 1. In this embodiment an observer 17 views a target along the deviated line of sight 18 while at the same time the observer views a collimated image of the reticle indicia 19 along the line of sight 20. The line of sight 18 to the target is deviated by two reflecting surfaces 21 and 22 which are arranged in periscopic relationship with the surface 21 providing the frequency selective beam combining effect. The collimated image of the reticle indicia is created by a refracting lens 23 having a positive focal length approximately equal to the distance from the lens to the reticle. Several optical elements are held in place by a sight body 24 which may include windows 25, 28 and 29 to make the structure dust and water proof. The reticle indicia 19 consists of light transmitting lines on an otherwise opaque background. In this embodiment an auxiliary light source 26 for night use is shown in place on the extended portion 27 of the sight body.

Referring to the operation of the sight of FIG. 3, light from the target will reach the observer along the deviated line of sight 18 by way of a fully silvered mirror 22 and the frequency selective reflector 21. Light from the general direction of the target and of the same general spectral content as the target will pass through the reticle indicia and be collimated by the lens 23 or under nighttime conditions light from the selectively removable auxiliary light source 26 will pass through the reticle indicia and similarly be collimated by the lens 23.

If the sight of the present invention is aimed at a red brick wall, the light illuminating the reticle 6 will have basically the same spectral content as the target view, however, the frequency selective beam combiner 4 will cause the reticle to appear superimposed on that target view in a contrasting color. The apparent red brick wall is actually only predominately red, but in fact reflects other colors at a lower intensity. Therefore since all apparently one colored objects in our surroundings do in fact give off other colors of light, the beam combining mirror in the present invention has been specially designed to make the target and reticle appear contrasting in color even while looking at any apparently monochromatic area such as a red brick wall, or a green forest. Therefore the present invention permits the reticle to always be distinguished without unduly darkening the target view.

In addition if the sight is aimed at a dimly lit target both the target view and the reticle will be dimly lit, and the observer will be able to see both. Similarly, since the reticle is illuminated by light from the target area, if an extremely bright target is viewed both the reticle and target will appear bright and clear to the observer. The combination of these two characteristics of the present invention for the first time allows a reflex sight to be usable under all daylight conditions using only ambient or incident natural light and without the use of an auxiliary light source.

Thus while the present invention has been described with respect to a preferred embodiment, numerous modifications will suggest themselves to those of ordinary skill in the art, and accordingly the scope of the present invention is to be measured only by that of the appended claims.

I claim:

1. A reflex sight for superimposing a view of a target and an image of reticle indicia comprising in combination:

light conducting reticle indicia comprising a light transmitting portion on an otherwise opaque background;

refractive collimating means having a positive focal length and displaced from the reticle indicia a distance approximately equal to its focal length to collimate an image of said reticle indicia;

first and second plane reflecting surfaces arranged in periscopic relation with the first surface being substantially fully reflective, said first and second surfaces in conjunction with said collimating means adapted to provide a displaced collimated image of said reticle indicia;

the second plane reflecting surface comprising frequency selective beam combining means through which a target may be viewed and reflected from which said collimated reticle image may be viewed, said second plane reflecting surface adapted to reflect over a substantial range of color frequencies of more than one basic color and to transmit over a substantial range of color frequencies of more than one basic color with the ratio of reflection to transmission varying for different color frequencies to thereby favor reflection over transmission in one portion of the visible spectrum while favoring transmission over reflection in another portion of the visible spectrum, said reticle indicia, said collimating means and said combining means being positioned with respect to each other so as to allow alignment of the reticle indicia image and the target with ambient light illuminating the reticle indicia being light from the target area to thereby provide a reticle image having an intensity which is proportional to the target intensity.

2. The reflex sight of claim 1 wherein the refractive collimating means lies between the reticle indicia and the first reflecting surface and further comprising a sight body supporting said light conducting reticle indicia said collimating means and said first and second reflective surfaces, said sight body having an integral forwardly extending portion for removably receiving an auxiliary light source whereby the auxiliary light source may be affixed to the sight body for night use and removed therefrom for daytime use, and first and second windows in the target view path for sealing the sight body against moisture, dust and the like.

3. A reflex sight for superimposing a view of a target and an image of reticle indicia comprising in combination:
light conducting reticle indicia comprising a light transmitting portion on an otherwise opaque background and adapted to be illuminated by down range light;
refractive collimating means having a positive focal length and displaced from the reticle indicia a distance approximately equal to its focal length to collimate an image of said reticle indicia;
first and second plane reflecting surfaces arranged in periscopic relationship with the first surface being substantially fully reflective to provide a displaced line of sight to a target;
the second plane reflecting surface comprising frequency selective beam combining means through which the collimated reticle image may be viewed and reflected from which a target may be viewed, said second reflecting surface adapted to reflect over a substantial range of color frequencies of more than one basic color and to transmit over a substantial range of color frequencies of more than one basic color with the ratios of reflection to transmission varying with color frequency to thereby favor reflection over transmission in one portion of the visible spectrum while favoring transmission over reflection in another portion of the visible spectrum, said reticle indicia, said collimating means and said combining means being positioned with respect to each other so as to allow alignment of the reticle indicia image and the target with the down range light illuminating the reticle indicia being light from the target area to thereby provide a reticle image having an intensity which is proportional to the target light intensity.

4. The reflex sight of claim 3 wherein the refractive collimating means lies between the reticle indicia and the second reflecting surface and further comprising a sight body supporting said light conducting reticle indicia said collimating means and said first and second reflective surfaces, said sight body having an integral forwardly extending portion for removably receiving an auxiliary light source whereby the auxiliary light source may be affixed to the sight body for night use and removed therefrom for daytime use, and first and second windows in the target view path for sealing the sight body against moisture, dust and the like.

5. A reflex sight comprising, in combination:
light conducting reticle indicia adapted to be illuminated by down range light,
collimating means to collimate an image of said reticle indicia, and
frequency selective beam combining means adapted to provide a view of a target and of said reticle indicia image and adapted to reflect over a substantial range of color frequencies of more than one basic color and to transmit over a substantial range of color frequencies of more than one basic color in varying ratios of reflection to transmission to thereby favor reflection over transmission in one portion of the visible spectrum while favoring transmission over reflection in another portion of the visible spectrum, said reticle indicia, said collimating means and said combining means being positioned with respect to each other so as to allow alignment of the reticle image and the target, the reticle indicia being positioned relative to the collimating means and the combining means to allow the down range light illuminating the reticle indicia to be light from the target area to thereby provide a reticle image having an intensity which is proportional to the target area light intensity.

6. The reflex sight of claim 5 wherein the frequency selective beam combining means transmits substantially the same percentages of the same portions of the spectrum of the reticle image and of the target view.

7. A reflex sight comprising, in combination:
light conducting reticle indicia adapted to be illuminated by down range light;
collimating means to collimate an image of said reticle indicia;
a sight body supporting said light conducting reticle indicia and said collimating means;
frequency selective beam combining means adapted to provide a view of a target and of said reticle indicia image and adapted to reflect over a substantial range of color frequencies of more than one basic color and to transmit over a substantial range of color frequencies of more than one basic color in varying ratios of reflection to transmission to thereby impart a color contrast between the reticle indicia image and the target view, said reticle indicia, said collimating means and said combining means being positioned with respect to each other and supported within the sight body so as to allow alignment of the reticle indicia image and the target, the reticle indicia being positioned relative to the collimating means and the combining means to allow the down range light illuminating the reticle indicia to be light from the target area to thereby provide a reticle image having an intensity which is proportional to the target area light intensity; and
first and second windows in the target view path for sealing the sight body against moisture, dust and the like.

8. The reflex sight of claim 7 wherein the frequency selective beam combining means transmits substantially the same percentages of the same portions of the spectrum of the reticle image and of the target view.

9. A reflex sight comprising, in combination:

light conducting reticle indicia adapted to be illuminated by down range light from the area of a target;
collimating means to collimate an image of said reticle indicia;
a sight body supporting said light conducting reticle indicia and said collimating means;
frequency selective beam combining means adapted to provide a superimposed view of a target and of said reticle indicia image including first and second plane reflecting surfaces arranged in periscopic relation with said first surface being substantially fully reflective, from which a reticle may be viewed reflectively, said second plane reflective surface comprising frequency selective beam combining means through which a target may be viewed and reflected from which said collimated reticle image may be viewed by way of reflection from said first surface, said first and second surfaces in conjunction with said collimating means adapted to provide a displaced collimated image of said reticle indicia, said second plane reflecting surface adapted to reflect over a substantial range of color frequencies and to transmit over a substantial range of color frequencies in varying ratios of reflection to transmission to thereby impart a color contrast between the reticle indicia image and the target view, said reticle indicia, said collimating means and said combining means being positioned with respect to each other and supported within the sight body so as to allow alignment of the reticle indicia image and the target with target area light illuminating the reticle indicia to provide a reticle image having an intensity which is proportional to the target area light intensity; and
first and second windows in the target view path for sealing the sight body against moisture, dust and the like.

* * * * *